(12) United States Patent
Haug et al.

(10) Patent No.: US 10,969,028 B2
(45) Date of Patent: Apr. 6, 2021

(54) SHROUDED VALVE ASSEMBLY

(71) Applicant: AIRBUS OPERATIONS GMBH, Hamburg (DE)

(72) Inventors: Manfred Haug, Hamburg (DE); Michael Rappitsch, Hamburg (DE); Konrad Rauch, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 15/581,672

(22) Filed: Apr. 28, 2017

(65) Prior Publication Data

US 2017/0314696 A1    Nov. 2, 2017

(30) Foreign Application Priority Data

Apr. 29, 2016 (EP) ..................................... 16167679

(51) Int. Cl.
*F16K 27/02* (2006.01)
*F16L 55/07* (2006.01)
(Continued)

(52) U.S. Cl.
CPC ........ *F16K 27/0218* (2013.01); *B64D 37/005* (2013.01); *F16K 1/22* (2013.01); *F16L 39/005* (2013.01); *F16L 55/07* (2013.01)

(58) Field of Classification Search
CPC ..... B64D 37/005; F16K 1/22; F16K 27/0218; F16L 55/07; F16L 39/005
(Continued)

(56) References Cited

U.S. PATENT DOCUMENTS

| 1,279,900 A | 9/1918 | Pearsall |
| 2,613,166 A * | 10/1952 | Gronemeyer ........... F16L 59/06 138/147 |

(Continued)

FOREIGN PATENT DOCUMENTS

| CA | 647005 A | 8/1962 |
| EP | 0207015 A2 | 12/1986 |

(Continued)

OTHER PUBLICATIONS

Extended European Search Report for Application No. 16167680 dated Oct. 14, 2016.

(Continued)

*Primary Examiner* — Angelisa L. Hicks
(74) *Attorney, Agent, or Firm* — Jenkins, Wilson, Taylor & Hunt, P.A.

(57) ABSTRACT

A shrouded valve assembly includes a valve with a valve pipe and a valve channel. A valve member in the valve channel can regulate flow of fluid through the valve channel. A valve shroud provides a valve shroud chamber. First and second shrouded pipe assemblies are on opposite sides of the valve, each including a pipe in fluid communication with a respective end of the valve channel, and a pipe shroud providing a pipe shroud chamber. Each pipe shroud chamber is in fluid communication with a respective end of the valve shroud chamber. The pipe assemblies are connected to the valve shroud by first and second connections and to the valve by third and fourth connections, the fourth connection more flexible than both the first connection and the second connection. Load passes between the pipe assemblies via the valve shroud rather than via the valve, protecting the valve from damage.

20 Claims, 4 Drawing Sheets

(51) Int. Cl.
*F16L 39/00* (2006.01)
*B64D 37/00* (2006.01)
*F16K 1/22* (2006.01)

(58) Field of Classification Search
USPC .......................................................... 137/248
See application file for complete search history.

(56) References Cited

U.S. PATENT DOCUMENTS

| | | | | |
|---|---|---|---|---|
| 3,208,539 | A * | 9/1965 | Henderson | E21B 21/12 138/114 |
| 4,071,267 | A * | 1/1978 | Davis | F16L 3/00 285/136.1 |
| 4,681,133 | A * | 7/1987 | Weston | F16K 11/087 137/315.18 |
| 4,925,218 | A | 5/1990 | Kunz et al. | |
| 5,018,548 | A | 5/1991 | McLennan | |
| 5,259,651 | A * | 11/1993 | Sharp | F16L 39/005 285/123.1 |
| 5,947,151 | A * | 9/1999 | Shafer | F17D 5/04 137/375 |
| 10,844,971 | B2 | 11/2020 | Haug et al. | |
| 2007/0051406 | A1 * | 3/2007 | Carns | F16K 1/22 137/312 |
| 2008/0265196 | A1 | 10/2008 | Hoffman | |
| 2011/0233923 | A1 | 9/2011 | Kouketsu et al. | |
| 2014/0284426 | A1 | 9/2014 | Erickson et al. | |
| 2017/0314697 | A1 | 11/2017 | Haug et al. | |

FOREIGN PATENT DOCUMENTS

| | | | | |
|---|---|---|---|---|
| EP | 1731810 | A2 | 12/2006 | |
| EP | 2251582 | A1 | 11/2010 | |
| EP | 3239564 | A1 | 11/2017 | |
| EP | 3239564 | B1 | 12/2018 | |
| FR | 1369501 | A | 8/1964 | |
| FR | 2978521 | A1 * | 2/2013 | ............ F16L 25/12 |
| GB | 2365949 | A | 2/2002 | |
| WO | WO 95/20737 | A2 | 8/1995 | |

OTHER PUBLICATIONS

Non-Final Office Action for U.S. Appl. No. 15/581,690 dated Jun. 29, 2018.
European Search Report for Application No. 16167679.6 dated Oct. 31, 2016.
Final Office Action for U.S. Appl. No. 15/581,690 dated Jun. 13, 2019.
Final Office Action for U.S. Appl. No. 15/581,690 dated Feb. 7, 2019.
Advisory Action for U.S. Appl. No. 15/581,690 dated Apr. 12, 2019.
Final Office Action for U.S. Appl. No. 15/581,690 dated Oct. 30, 2019.
Notice of Allowance for U.S. Appl. No. 15/581,690 dated Sep. 2, 2020.
Corrected Notice of Allowance for U.S. Appl. No. 15/581,690 dated Oct. 22, 2020.

* cited by examiner

SHROUDED VALVE ASSEMBLY

CROSS-REFERENCE TO RELATED APPLICATION

This application claims priority to European Patent Application EP 16 167 679.6 filed Apr. 29, 2016, the entire disclosure of which is incorporated by reference herein.

TECHNICAL FIELD

The present disclosure relates to a shrouded valve assembly.

BACKGROUND

A known shrouded valve assembly is described in EP-A-1731810. An inner conduit is disposed within an outer conduit, and a valve member is operable to regulate flow through the inner conduit. In one embodiment the valve apparatus is fabricated by joining two parts together to form a flange. The valve apparatus is connected between two fluid-conducting apparatus at joints which may be substantially fixed or may be flexible.

SUMMARY

The disclosure herein provides a shrouded valve assembly. The shrouded valve assembly comprises a valve with a valve pipe and a valve channel. A valve member in the valve channel is operable to regulate a flow of fluid through the valve channel. A valve shroud shrouds the valve pipe and provides a valve shroud chamber between the valve pipe and the valve shroud. First and second shrouded pipe assemblies are arranged on opposite sides of the valve. Each shrouded pipe assembly comprises a pipe which is in fluid communication with a respective end of the valve channel, and a pipe shroud which shrouds the pipe and provides a pipe shroud chamber between the pipe and the pipe shroud. Each pipe shroud chamber is in fluid communication with a respective end of the valve shroud chamber. The first and second shrouded pipe assemblies are connected to the valve shroud by respective first and second connections and to the valve by respective third and fourth connections.

The fourth connection is more flexible than both the first connection and the second connection. As a result load passes between the first and second shrouded pipe assemblies via the valve shroud rather than via the valve, thereby protecting the valve from damage.

Typically first and second spacers are arranged on opposite sides of the valve, each spacer maintaining a radial spacing between the valve and the valve shroud and comprising one or more holes to permit fluid to flow through the spacer between the valve shroud chamber and a respective one of the pipe shroud chambers.

The first or second connection may be a welded connection, but more preferably the first or second shrouded pipe assembly comprises a flange, and the first or second connection comprises a clamp or a plurality of fasteners which connect the flange to the valve shroud.

Optionally both the third and fourth connections are flexible connections. Alternatively the fourth connection may be more flexible than the third connection.

The fourth connection typically comprises a floating connection—for instance formed by a first tube within a second tube, the first and second tubes being separated by a resilient O-ring which forms a seal between the first and second tubes and permits the first and second tubes to move axially relative to each other.

Typically a connector with a tube connects the second shrouded pipe assembly to the valve, thereby providing the fourth connection. The connector may comprise a flange which connects the second shrouded pipe assembly to the valve, thereby providing the second connection. The connector may be connected to the pipe of the second shrouded pipe assembly by a fifth connection, wherein the fifth connection is more flexible than both the first connection and the second connection.

Preferably the valve shroud has a substantially spherical inner surface which defines an outer boundary of the valve shroud chamber. This avoids any local accumulation of liquid in the chamber. The valve shroud typically also has a substantially spherical outer surface.

A drain port fitting may be fitted to the valve shroud, wherein the drain port is configured to enable liquid to be drained out of the valve shroud chamber through the drain port fitting.

Typically the assembly is connected to an aircraft structure.

BRIEF DESCRIPTION OF THE DRAWINGS

Example embodiments of the disclosure herein will now be described with reference to the accompanying drawings, in which.

DETAILED DESCRIPTION

Figure 1:
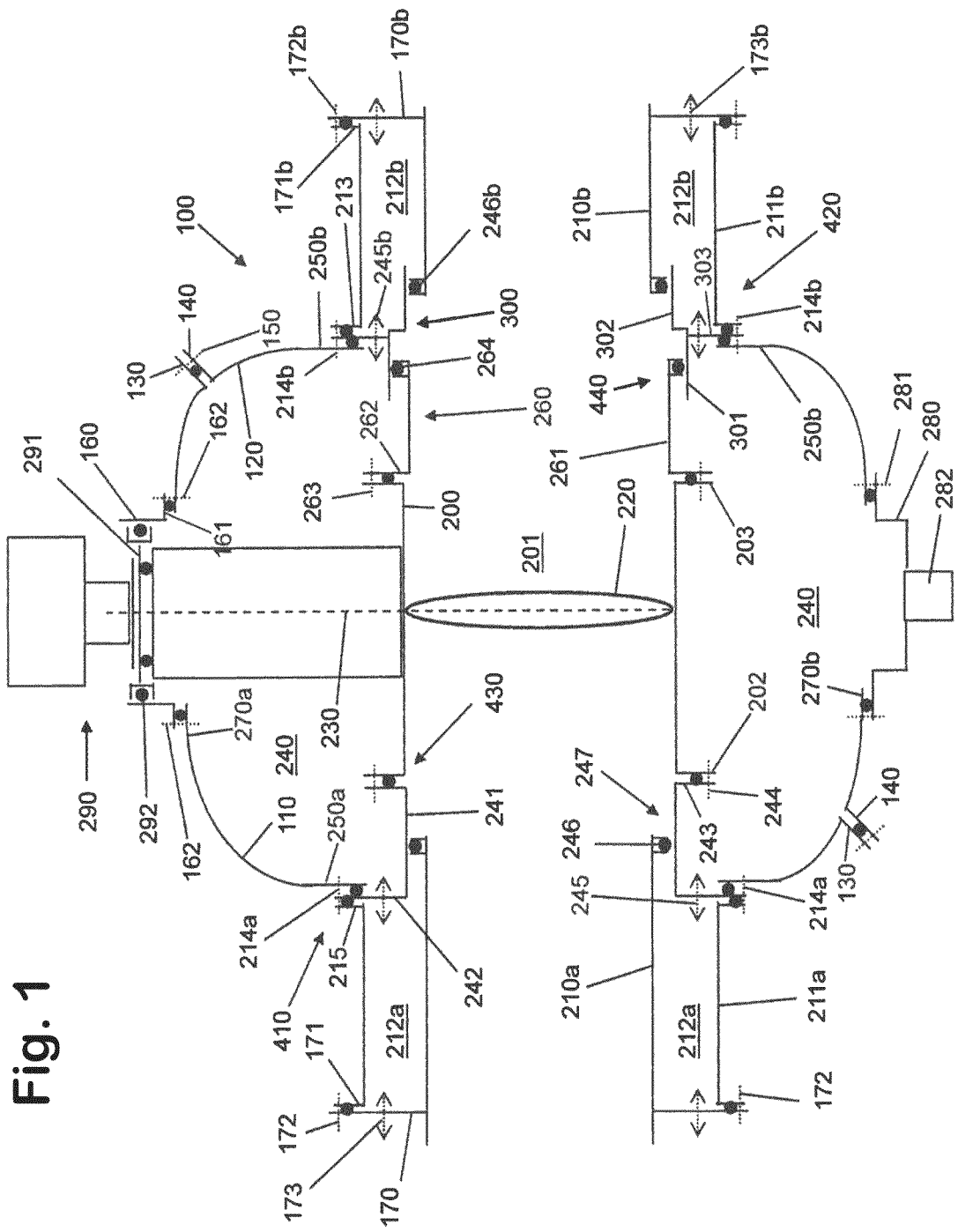
FIG. 1 is a schematic sectional view of a shrouded valve assembly according to a first embodiment of the disclosure herein.

A shrouded valve assembly 100 according to a first embodiment of the disclosure herein is shown in FIG. 1. The assembly comprises a butterfly valve comprising a valve pipe 200 with a valve channel 201, and a valve member 220 in the valve channel. The valve member 220 is carried on an actuator shaft 230 which can be rotated to regulate a flow of fuel through the valve channel. More specifically the valve member 220 can be oriented at right angles to the flow to fill the valve channel 201 and block the flow—or rotated to lie parallel with the flow so the fuel can flow through the channel on either side of the valve member 220. The valve member 220 is shown in FIG. 1 oriented at an oblique angle.

The actuator shaft 230 extends in an actuator shaft direction which is vertical in FIG. 1, at right angles to the horizontal flow axis of the valve channel 201. A valve shroud 110, 120 shrouds the valve pipe 200, and provides a valve shroud chamber 240 between the valve pipe 200 and the valve shroud 110, 120.

The valve shroud comprises a pair of identical valve shroud members 110, 120. The valve shroud members 110, 120 are fixed to each other by bolts 150 passing through respective annular valve shroud flanges 130, 140. The valve shroud flanges have opposed planar faces which meet in a plane which is inclined at 45° to the vertical actuator direction and to the horizontal flow axis of the valve channel.

Each valve shroud member 110, 120 has a planar side wall 250a, b with a respective circular opening. Similarly each valve shroud member 110, 120 has a planar upper/lower wall 270a, b with a respective circular opening. The actuator shaft 230 passes through the circular opening in the upper wall 270a of the first valve shroud member 110. The circular opening in the lower wall 270b of the second valve shroud member 120 contains a drain port fitting 280 which is connected to the lower wall 270b by fasteners 281. A drain pipe or drain hose (not shown) can be connected to a standard screwed fitting 282 (for example MS21902W8) at the bottom of the drain port fitting 280. In the event of a leakage from the valve channel 201, the leaked fuel flows by gravity to the low point of the valve shroud chamber 240 and then flows by the action of gravity out of the shroud through the fitting 280 and the drain pipe/hose.

Inclining the valve shroud flanges 130, 140 at an acute angle (in this case) 45° to the actuator shaft direction provides technical advantages compared with an alternative arrangement in which the interface between them is vertical (i.e. parallel to the actuator shaft direction). Firstly, it enables the actuator shaft 230 to pass through the first valve shroud member 110 but not through the second valve shroud member 120. This enables a simple interface to be provided between the actuator shaft 230 and the valve shroud member 110 (which will be described below) and also enables the valve to be inspected by disassembling this interface without having to disassemble the pair of valve shroud members 110, 120 by removing the fasteners 150. Similarly, it enables the drain port fitting 280 to be held by only the second valve shroud member 120 and not the first valve shroud member 110. This enables a simple interface to be provided between the drain port fitting 280 and the valve shroud, and also enables the fitting 280 to be removed after removing the fasteners 281 without having to disassemble the valve shroud members 110, 120 by removing the fasteners 150. Once the fitting 280 has been removed then the valve can be visually inspected from below. Advantageously the valve shroud members 110, 120 have a substantially identical construction.

Each valve shroud member 110, 120 has a substantially spherical inner surface which faces towards the valve and defines an outer boundary of the valve shroud chamber 240. Each valve shroud member 110, 120 also has a substantially spherical outer surface facing away from the valve. This spherical shape provides an efficient transfer of load across the valve shroud. The spherical inner surface also avoids any local accumulation of liquid since all liquid in the chamber 240 runs by gravity to only a single point.

The first valve shroud member 110 is rigidly attached at its upper end by fasteners 162 to an actuator support comprising a tubular collar 160 with a flange 161. The valve can be inspected from above by removing the fasteners 162 and then removing the collar 160. A small mirror with a telescopic arm can then be inserted from above to see details of the lower surfaces of the valve.

The valve member 220 and actuator shaft 230 are carried by an actuator stem assembly 290 which includes a circular plate 291 carrying an O-ring 292. The O-ring provides a floating connection between the actuator stem assembly 290 and the collar 160, enabling the actuator stem assembly 290 to move relatively freely up and down relative to the valve shroud. This floating connection compensates for vertical tolerances thereby avoiding vertical axial stress in the connection between the actuator stem assembly and the collar 160.

The shrouded valve assembly 100 is connected on its left side to a first shrouded pipe assembly and on its right side to a second shrouded pipe assembly which will now be described. In the description below the left side of the valve is indicated as an inlet side and the right side is indicated as an outlet side. However the flow direction may be reversed so flow is in the opposite direction.

On the inlet (left) side of the valve is a first shrouded pipe assembly comprising an inner inlet pipe 210a and an inlet pipe shroud 211a. The inner inlet pipe 210a is in fluid communication with an inlet (left) end of the valve channel 201. The inlet pipe shroud 211a shrouds the inner inlet pipe 210a and provides an inlet pipe shroud chamber 212a between them. The inlet pipe shroud chamber 212a is in fluid communication 245 with an inlet (left) end of the valve shroud chamber 240 via holes in a spacer which will be described below.

The inner inlet pipe 210a and the inlet pipe shroud 211a have respective flanges 170, 171 at their left ends which are joined by fasteners 172. The flange 170 has holes which permit liquid to flow through it as indicated by double-headed arrow 173, in and out of the inlet pipe shroud chamber 212a. The inlet pipe shroud 211a is rigidly connected to the valve shroud member 110 by fasteners 214a which pass through a flange 215 of the inlet pipe shroud 211a and the planar side wall 250a of the valve shroud member 110.

The valve pipe 200 has a first flange 202 at its inlet (left) end and a second flange 203 at its outlet (right) end. A rigid connector 247 rigidly connects the inlet pipe shroud 211a and the valve shroud member 110 to the valve pipe 200. The rigid connector 247 has a tubular body 241, a flange 242 at its left end and a flange 243 at its right end. The flange 242 is rigidly connected to the side wall 250a and to the flange 215 by the fasteners 214a. The flange 243 is rigidly connected to the flange 202 by fasteners 244.

The flange 242 of the rigid connector 247 has holes which allow liquid to pass from the valve shroud chamber 240 into the inlet pipe shroud chamber 212a and vice-versa as indicated by double-headed arrow 245. The flange 242 acts as a spacer, maintaining a fixed radial spacing between the inner pipes 200, 210a and their respective shrouds. The flange 242 also provides a rigid connection between the tubular body 241 of the rigid connector 247 and the first valve shroud member 110.

The inner inlet pipe 210a is received within the tubular body 241 of the spacer, and an O-ring 246 makes a seal between them. This O-ring 246 provides a floating connection between the inner pipe 210a and the rigid connector 247, in other words the inner pipe 210a can move relatively freely to the right and left relative to the spacer. This floating connection compensates for horizontal tolerances between the inner pipe 210a and the rigid connector 247, thereby avoiding horizontal axial stress in the connection between them.

On the outlet side (right) of the valve is a second shrouded pipe assembly comprising an inner outlet pipe 210b and an outlet pipe shroud 211b. The inner outlet pipe 210b is in fluid communication with an outlet (right) end of the valve channel 201. The outlet pipe shroud 211b shrouds the inner outlet pipe 210b and provides an outlet pipe shroud chamber 212b between them. Similarly the outlet pipe shroud chamber 212b is in fluid communication with the outlet (right)

end of the valve shroud chamber 240 via holes in a floating connector 300 which will be described below.

The inner outlet pipe 210b and the outlet pipe shroud 211b have respective flanges 170b, 171b at their right ends which are joined by fasteners 172b. The flange 170b has holes which permit liquid to flow through it, in and out of the inlet pipe shroud chamber 212a as indicated by double-headed arrow 173b.

The outlet pipe shroud 211b is rigidly connected to the valve shroud member 120 by fasteners 214b which pass through a flange 213 of the outlet pipe shroud 211b and the planar side wall 250b of the valve shroud member 120.

A first floating connector 300 is provided between the valve shroud and the second shrouded pipe assembly 210b, 211b. The floating connector 300 comprises a pair of tubular parts 301, 302 and a flange 303. The flange 303 has holes which allow liquid to pass from the valve shroud chamber 240 into the outlet pipe shroud chamber 212b and vice-versa as indicated by double-headed arrow 245b. The flange 303 acts as a spacer, maintaining a fixed radial spacing between the inner pipes 200, 210b and their respective shrouds. The flange 303 also provides a rigid connection between the tubular body 301, 302 of the rigid connector 300 and the second valve shroud member 120.

The inner outlet pipe 210b is received within the tubular body 302 of the spacer 300, and an O-ring 246b makes a seal between them. This O-ring 246b provides a floating connection between the inner pipe 210b and the spacer 300, in other words the inner pipe 210b can move relatively freely to the right and left relative to the spacer. This floating connection compensates for horizontal tolerances between the inner pipe and the floating connector 300, thereby avoiding horizontal axial stress in the connection between them.

The outlet pipe shroud 211b has a flange 213 at its inlet (left) end. The flange 213 is rigidly connected to the valve shroud member 120 and the flange 303 of the spacer 300 by fasteners 214b which pass through the flanges 213, 303 and into the planar side wall 250b of the valve shroud member 120.

A second floating connector 260 connects the first floating connector 300 to the valve pipe 200. The floating connector 260 has a tubular body 261 and a flange 262 at its left end. The flange 262 is rigidly connected to the flange 203 of the valve pipe 200 by fasteners 263. The right-hand end of the tubular body 261 is received within the tubular part 301 of the first floating connector 300 and an O-ring 264 makes a seal between them. This O-ring 264 provides a floating connection 440 between the first and second floating connectors 300, 260.

This floating connection 440 ensures that external loads pass between the first and second shrouded pipe assemblies via the valve shroud 110, 120 without passing through the valve 200 or the second floating connector 260. The shrouded valve assembly 100 is rigidly connected at its inlet (left) end to an aircraft structure (such as a fuselage). At its outlet (right) end the shrouded valve assembly 100 is rigidly connected to the same aircraft structure. During flight of the aircraft, aerodynamic forces will tend to cause the aircraft structure to flex or otherwise deflect which will in turn cause the connection points where the two sides of the assembly 100 are attached to the structure to move relative to each other. This movement will cause loads to be transmitted across the shrouded valve assembly 100. Loads can also be generated by internal pipe system pressure. It is desirable that such loads are not transmitted across the assembly 100 via the valve pipe 200 in order to protect the valve. The first and second shrouded pipe assemblies are rigidly connected to the valve shroud members 110, 120 by respective fasteners 214a,b which provide first and second rigid connections 410, 420. A third rigid connection 430 via the rigid connector 247 and fasteners 244 also connects the first shrouded pipe assembly 210a, 211a to the valve. The floating connection 440 via the O-ring 264 connects the second shrouded pipe assembly 210b, 211b to the valve via the floating connectors 300, 260. This floating connection 440 is significantly more flexible than both the rigid connections 410, 420. As a result, load from the second shrouded pipe assembly (either from the inner outlet pipe 210b or from the outlet pipe shroud 211b) passes through the second rigid connection 420 into the valve shroud member 120, then into the valve shroud member 110, and then into the inlet pipe shroud 211a via the first rigid connection 410 with the valve shroud member 120. The floating connection 440 ensures that little or none of this load passes through the floating connector 260 and into the valve.

As well as preventing loads from passing through the valve, the floating connection 440 also compensates for horizontal tolerances between the floating connectors 300, 260, thereby avoiding horizontal axial stress in the connection between them.

Figure 2:
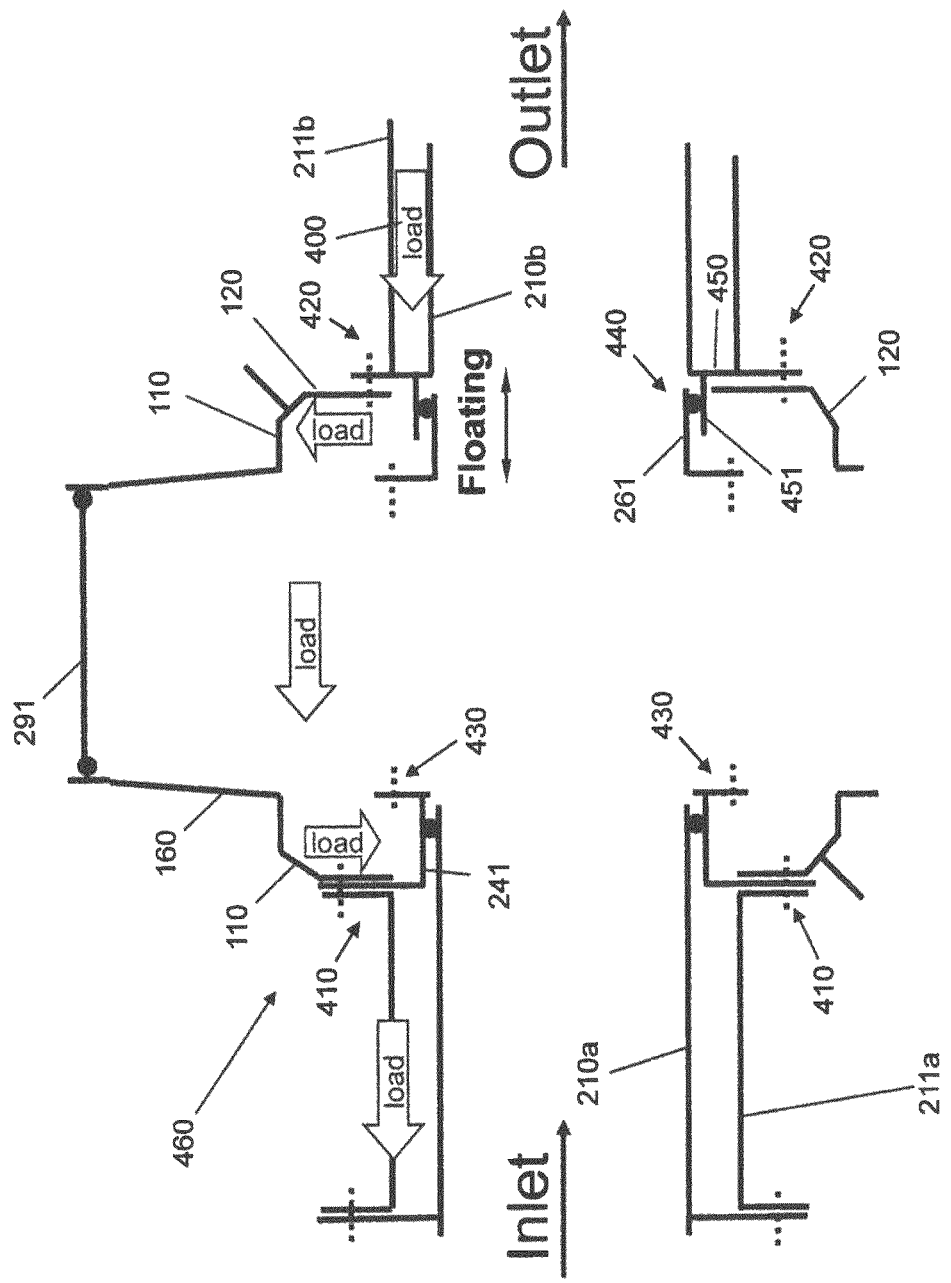
FIG. 2 is a schematic sectional view of a shrouded valve assembly according to a second embodiment of the disclosure herein.

Various parts of a shrouded valve assembly 460 according to a second embodiment of the disclosure herein are shown in FIG. 2. FIG. 2 is a schematic diagram which omits various elements for purposes of clarity. Many of the parts in the embodiment of the FIG. 2 have equivalents in the embodiment of FIG. 1, and are given the same reference numeral.

As with the embodiment of FIG. 1, the first and second shrouded pipe assemblies are connected to the valve shroud 110, 120 by respective first and second rigid connections 410, 420. The rigid connection 430 connects the first shrouded pipe assembly 210a, 211a to the valve (not shown). The floating connection 440 connects the second shrouded pipe assembly 210b, 211b to the valve and ensures that little or none of the load passes through fitting 261 and then through the valve. The dominant load path is shown in FIG. 2 by block arrows.

The embodiment of FIG. 2 differs from the embodiment of FIG. 1 in that there is no spacer 300 on the outlet side. Instead, the inner outlet pipe 210b and outlet pipe shroud 211b are rigidly connected to each other by a spacer web 450 which may be formed integrally with, or welded to, the pipe 210b and shroud 211b. The floating connection 440 with the fitting 261 is made by a tubular part 451 which may be formed integrally with, or welded to, the spacer web 450.

Figure 3:
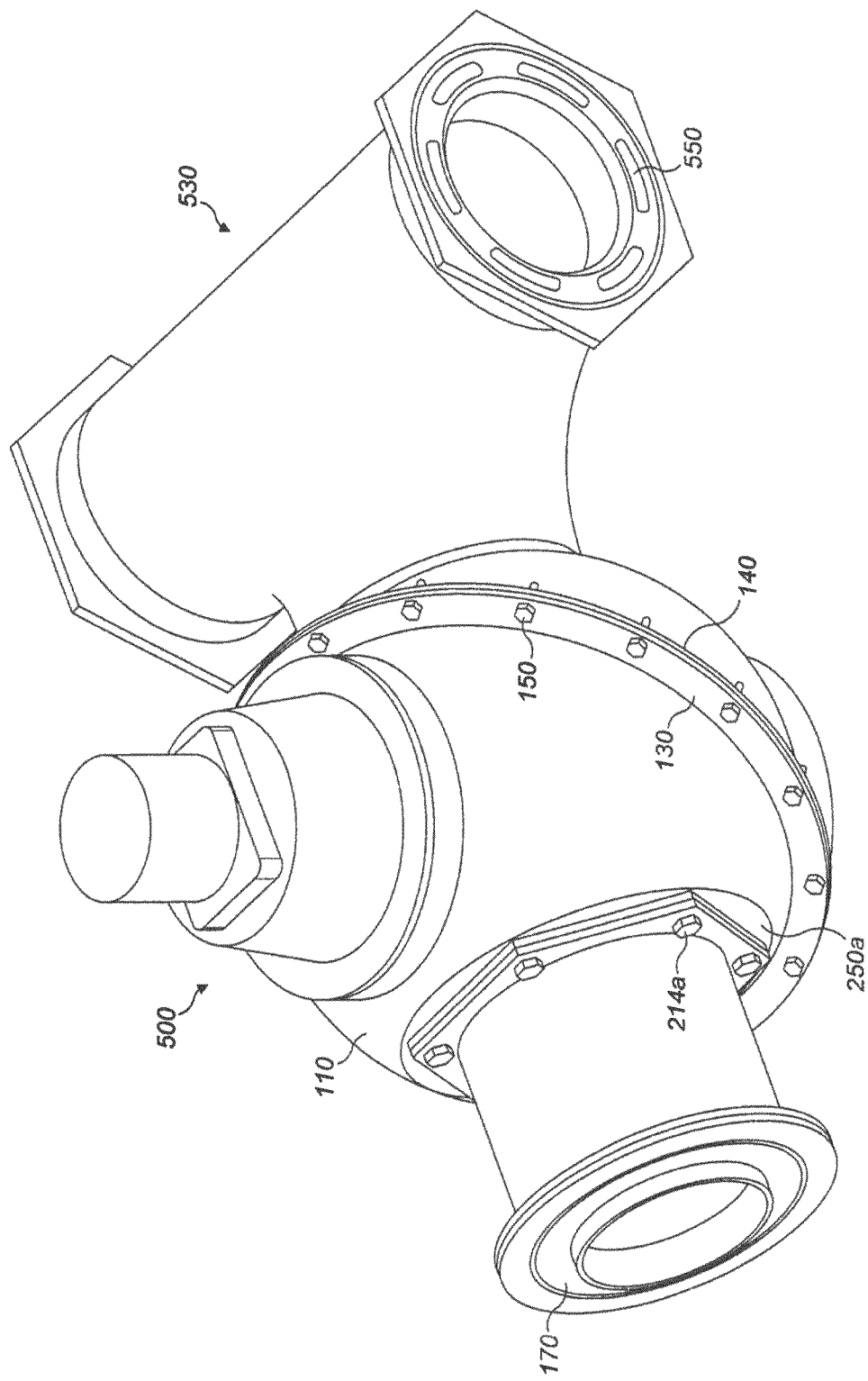
FIG. 3 is an isometric view of a shrouded valve assembly according to a third embodiment of the disclosure herein.
Figure 5:
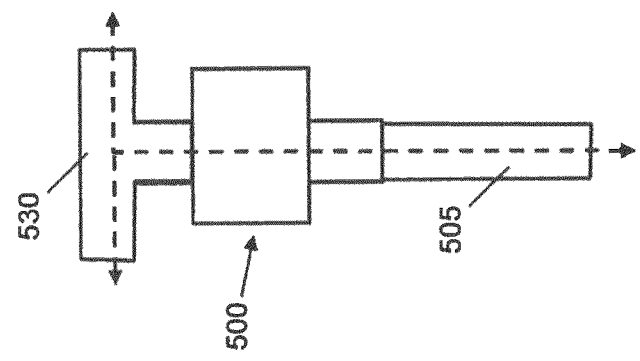
FIG. 5 is a schematic end view of the shrouded valve assembly of FIG. 3 installed on an aircraft.
Figure 4:
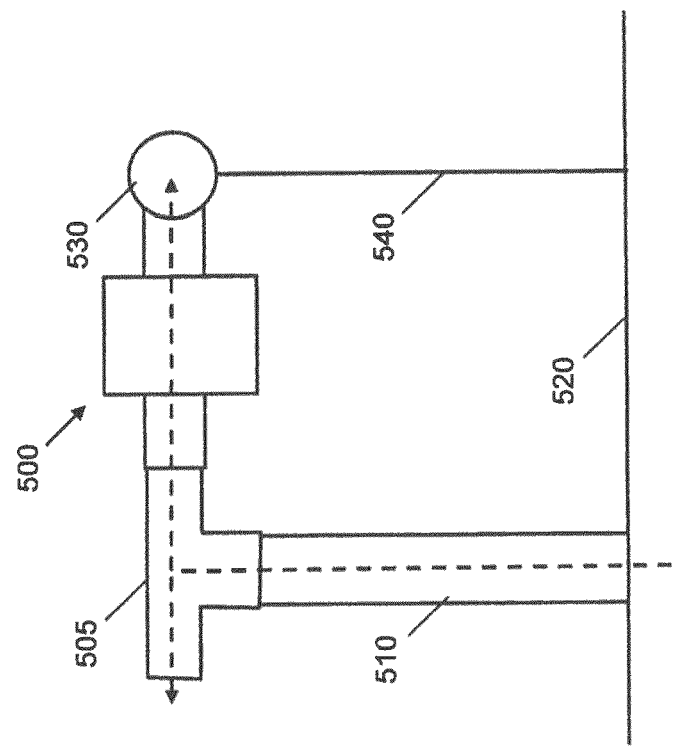
FIG. 4 is a schematic side view of the shrouded valve assembly of FIG. 3 installed on an aircraft.

A shrouded valve assembly 500 according to a third embodiment of the disclosure herein is shown in FIGS. 3-5. Many of the parts in the embodiment of FIGS. 3-5 have equivalents in the embodiments of FIGS. 1 and 2, and are given the same reference numeral.

The embodiment of FIG. 3 differs from the embodiment of FIG. 1 in that there are no holes in the flange 170. By omitting the holes in the flange 170, the system is divided into two separate sub-systems fitted together at this flange 170. The embodiment of FIG. 3 also differs from the embodiment of FIG. 1 in that a T-fitting 530 is provided on the outlet side of the valve. Six holes 550 are shown in the fitting 530, and the holes in the parts 170, 242, 303 and 170b (in FIG. 1) have a similar size and shape.

As shown in FIGS. 4 and 5, the shrouded valve assembly 500 is connected at its inlet (left) end to an aircraft structure 520 (such as a fuselage) via a T-fitting 505 and a pipe 510. Fuel pumped vertically through the pipe 510 thus can pass into the assembly 500 via the T-fitting 505. At its outlet (right) end the shrouded valve assembly 500 is connected to the same aircraft structure 520 via the T-fitting 530 and a rigid rod 540. During flight of the aircraft, aerodynamic forces will tend to cause the structure 520 to flex or otherwise deflect which will in turn cause the connection points where the pipe 510 and the rod 540 are attached to the structure to move relative to each other. This movement will cause loads to be transmitted across the shrouded valve assembly 500. The floating connection ensures that such loads are not transmitted across the assembly 500 via the valve pipe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A shrouded valve assembly comprising:
a valve comprising a valve pipe with a valve channel, and a valve member in the valve channel which is operable to regulate a flow of fluid through the valve channel;
a valve shroud which shrouds the valve pipe and provides a valve shroud chamber between the valve pipe and the valve shroud; and
a first shrouded pipe assembly comprising an inlet pipe which is in fluid communication with an inlet end of the valve channel, and an inlet pipe shroud which shrouds the inlet pipe and provides an inlet pipe shroud chamber between the inlet pipe and the inlet pipe shroud, the inlet pipe shroud chamber being in fluid communication with an inlet end of the valve shroud chamber;
a second shrouded pipe assembly comprising an outlet pipe which is in fluid communication with an outlet end of the valve channel, and an outlet pipe shroud which shrouds the outlet pipe and provides an outlet pipe shroud chamber between the outlet pipe and the outlet pipe shroud, the outlet pipe shroud chamber being in fluid communication with an outlet end of the valve shroud chamber;
wherein the inlet pipe shroud is connected to the valve shroud by a first connection,
wherein the outlet pipe shroud is connected to the valve shroud by a second connection,
wherein the inlet pipe is connected to the valve pipe by a third connection,
wherein the outlet pipe is connected to the valve pipe by a fourth connection,
wherein the fourth connection is more flexible than both the first connection and the second connection,
wherein the fourth connection comprises a first floating connector, which comprises a first tube, and a second floating connector, which comprises at least a second tube,
wherein the first tube is within the second tube and separated therefrom by a resilient O-ring which forms a seal between the first tube and the second tube and permits the first tube and the second tube to move axially relative to each other,
wherein the second floating connector is configured to permit the second tube and the outlet pipe to move axially relative to each other, and
wherein the first tube is removably connected to the valve pipe and the resilient O-ring is disposed on an outer radial surface of the first tube.

2. The shrouded valve assembly of claim 1, wherein the first connection comprises a first spacer arranged on an inlet side of the valve, the first spacer being configured to maintain a radial spacing between the valve and the valve shroud and comprising one or more holes to permit fluid to flow through the first spacer, between the valve shroud chamber and the inlet pipe shroud chamber.

3. The shrouded valve assembly of claim 2, wherein the first spacer is in a form of a tubular body comprising a flange.

4. The shrouded valve assembly of claim 1, wherein the inlet pipe shroud comprises an inlet shroud flange and/or the outlet pipe shroud comprises an outlet shroud flange, and wherein the first connection comprises a plurality of fasteners which connect the inlet shroud flange to the valve shroud and/or the second connection comprises a plurality of fasteners which connect the outlet shroud flange to the valve shroud.

5. The shrouded valve assembly of claim 1, wherein the fourth connection is more flexible than the third connection.

6. The shrouded valve assembly of claim 1, wherein the second tube is formed integrally with, or welded to, the second shrouded pipe assembly.

7. The shrouded valve assembly of claim 1, wherein the second floating connector connects the outlet pipe to the valve pipe, wherein the second tube comprises a first tubular part, by which the second floating connector is connected, at the fourth connection, to the first tube, and a second tube flange is configured to connect the outlet pipe shroud to the valve shroud to form the second connection.

8. The shrouded valve assembly of claim 7, wherein the second tube comprises a second tubular part, wherein the second floating connector is connected to the outlet pipe by the second tubular part.

9. The shrouded valve assembly of claim 8, wherein the second tubular part is separated from the outlet pipe by a resilient O-ring which forms a seal between the second tubular part and the outlet pipe and permits the second tubular part and the outlet pipe to move axially relative to each other.

10. The shrouded valve assembly of claim 1, wherein the assembly is connected to an aircraft structure.

11. A shrouded valve assembly comprising:
a valve comprising a valve pipe with a valve channel, and a valve member in the valve channel which is operable to regulate a flow of fluid through the valve channel;
a valve shroud which shrouds the valve pipe and provides a valve shroud chamber between the valve pipe and the valve shroud; and
a first shrouded pipe assembly comprising an outlet pipe which is in fluid communication with an outlet end of the valve channel, and an outlet pipe shroud which shrouds the outlet pipe and provides an outlet pipe shroud chamber between the outlet pipe and the outlet pipe shroud, the outlet pipe shroud chamber being in fluid communication with an outlet end of the valve shroud chamber;
a second shrouded pipe assembly comprising an inlet pipe which is in fluid communication with an inlet end of the valve channel, and an inlet pipe shroud which shrouds the inlet pipe and provides an inlet pipe shroud chamber between the inlet pipe and the inlet pipe shroud, the inlet pipe shroud chamber being in fluid communication with an inlet end of the valve shroud chamber;

wherein the outlet pipe shroud is connected to the valve shroud by a first connection, wherein the inlet pipe shroud is connected to the valve shroud by a second connection, wherein the outlet pipe is connected to the valve pipe by a third connection, wherein the inlet pipe is connected to the valve pipe by a fourth connection, wherein the fourth connection is more flexible than both the first connection and the second connection, wherein the fourth connection comprises a first floating connector, which comprises a first tube, and a second floating connector, which comprises at least a second tube, wherein the first tube is within the second tube and separated therefrom by a resilient O-ring which forms a seal between the first tube and the second tube and permits the first tube and the second tube to move axially relative to each other, wherein the second floating connector is configured to permit the second tube and the inlet pipe to move axially relative to each other, and wherein the first tube is removably connected to the valve pipe and the resilient O-ring is disposed on an outer radial surface of the first tube.

12. The shrouded valve assembly of claim 11, wherein the first connection comprises a first spacer arranged on an outlet side of the valve, the first spacer being configured to maintain a radial spacing between the valve and the valve shroud and comprising one or more holes to permit fluid to flow through the first spacer, between the valve shroud chamber and the outlet pipe shroud chamber.

13. The shrouded valve assembly of claim 12, wherein the first spacer is in a form of a tubular body comprising a flange.

14. The shrouded valve assembly of claim 11, wherein the inlet pipe shroud comprises an inlet shroud flange and/or the outlet pipe shroud comprises an outlet shroud flange, and wherein the first connection comprises a plurality of fasteners which connect the outlet shroud flange to the valve shroud and/or the second connection comprises a plurality of fasteners which connect the inlet shroud flange to the valve shroud.

15. The shrouded valve assembly of claim 11, wherein the fourth connection is more flexible than the third connection.

16. The shrouded valve assembly of claim 11, wherein the second tube is formed integrally with, or welded to, the second shrouded pipe assembly.

17. The shrouded valve assembly of claim 11, wherein the second floating connector connects the inlet pipe to the valve pipe, wherein the second tube comprises a first tubular part, by which the second floating connector is connected, at the fourth connection, to the first tube, and a second tube flange configured to connect the inlet pipe shroud to the valve shroud to form the second connection.

18. The shrouded valve assembly of claim 17, wherein the second tube comprises a second tubular part, wherein the second floating connector is connected to the inlet pipe by the second tubular part.

19. The shrouded valve assembly of claim 18, wherein the second tubular part is separated from the inlet pipe by a resilient O-ring which forms a seal between the second tubular part and the inlet pipe and permits the second tubular part and the inlet pipe to move axially relative to each other.

20. The shrouded valve assembly of claim 11, wherein the assembly is connected to an aircraft structure.

* * * * *